(12) United States Patent
Fuentes

(10) Patent No.: US 12,714,083 B1
(45) Date of Patent: Aug. 25, 2026

(54) HANDHELD MARINE LIFE HOLDING APPARATUS WITH COUNTER

(71) Applicant: Luis Armando Fuentes, Miami, FL (US)

(72) Inventor: Luis Armando Fuentes, Miami, FL (US)

( * ) Notice: Subject to any disclaimer, the term of this patent is extended or adjusted under 35 U.S.C. 154(b) by 0 days.

(21) Appl. No.: 19/260,897

(22) Filed: Jul. 7, 2025

(51) Int. Cl.
*A01K 97/20* (2006.01)

(52) U.S. Cl.
CPC .................................... *A01K 97/20* (2013.01)

(58) Field of Classification Search
CPC ........ A01K 97/05; A01K 97/20; A01K 97/00; A01K 75/00; A01K 74/00
See application file for complete search history.

(56) References Cited

U.S. PATENT DOCUMENTS 2,765,535 A * 10/1956 Weber .................... A01K 77/00 43/25
3,803,742 A * 4/1974 Foster .................... A01K 97/14 43/6
4,357,902 A 11/1982 Sheldon
4,498,190 A * 2/1985 Garlick, III ............ B65D 85/50 383/102
5,156,291 A * 10/1992 Mielke ................... A01K 97/20 220/264
5,224,131 A * 6/1993 Searfoss ............... G07F 7/0609 377/6
5,501,026 A * 3/1996 Bryant ................... A01K 77/00 43/11
5,548,917 A * 8/1996 Holwadel .............. A01K 61/90 D22/199
D375,782 S * 11/1996 Rackley ....................... D22/135
5,941,016 A * 8/1999 Welcher ................. A01K 97/20 220/323
6,809,658 B1 * 10/2004 Lofaso ..................... G08B 5/36 43/9.3
7,412,794 B2 * 8/2008 Smith .................. A01K 87/007 43/25
7,866,541 B2 * 1/2011 Kerekes ................. A01K 97/20 235/1 B
8,044,337 B2 * 10/2011 Duszynski ............. G06M 11/00 250/221
8,756,856 B1 * 6/2014 Girvin .................... A01K 97/20 220/560
9,271,558 B1 * 3/2016 Sandford .................. A45F 3/00
(Continued)

*Primary Examiner* — Katelyn T Truong
(74) *Attorney, Agent, or Firm* — Albert Bordas, Esq.

(57) ABSTRACT

A handheld marine life holding apparatus with counter, comprising an apparatus assembly, a flap pulley system, and a net assembly. The apparatus assembly contains an apparatus body that defines a first apparatus opening and a second apparatus opening. The apparatus body comprises a handle. The apparatus body further comprises a belt attachment point with a carabiner hole. The belt attachment point is located opposite to the handle. The handle comprises at least two prongs. The at least two prongs are used to measure marine life. The apparatus assembly comprises a counter mounted onto the apparatus body. The flap pulley system is mounted onto the apparatus body and attached to the counter. The flap pulley system comprises a flap having a flap wire. The flap pulley system is incorporated within the apparatus body. The counter has reset knob. The net assembly comprises a net.

8 Claims, 4 Drawing Sheets

(56) References Cited

U.S. PATENT DOCUMENTS

| | | | | |
|---|---|---|---|---|
| 9,516,866 | B2 * | 12/2016 | ElHage | A01K 63/02 |
| 9,842,292 | B1 * | 12/2017 | Miller | G06M 1/083 |
| 10,856,534 | B2 * | 12/2020 | Waters | A01K 77/00 |
| 11,140,886 | B1 * | 10/2021 | Shore | A01K 97/20 |
| 11,779,002 | B2 * | 10/2023 | Davidson | B65D 33/02<br>43/55 |
| 2003/0056419 | A1 | 3/2003 | Squires | |
| 2007/0277427 | A1 | 12/2007 | Goodwin | |
| 2008/0230542 | A1 * | 9/2008 | Thielke | A01K 97/00<br>220/212 |
| 2012/0102811 | A1 * | 5/2012 | Waugh | F41B 13/10<br>43/6 |
| 2012/0144722 | A1 | 6/2012 | Havens | |
| 2013/0091755 | A1 | 4/2013 | Abstract | |
| 2013/0109259 | A1 | 5/2013 | Abulrassoul | |
| 2015/0161504 | A1 * | 6/2015 | Scott | B65F 1/10<br>116/284 |
| 2016/0309692 | A1 | 10/2016 | Opshaug | |
| 2016/0363476 | A1 | 12/2016 | Van Komen | |
| 2023/0148576 | A1 * | 5/2023 | Mierzejewski | A01K 80/00<br>43/42.7 |
| 2023/0165228 | A1 | 6/2023 | Brighi | |
| 2024/0057575 | A1 | 2/2024 | Hong | |

* cited by examiner

HANDHELD MARINE LIFE HOLDING APPARATUS WITH COUNTER

BACKGROUND OF THE INVENTION

The present invention relates to marine life holding apparatuses, and more particularly, to handheld marine life holding apparatuses with counters.

PRIOR ART

Applicant believes that one of the closest references corresponds to U.S. Patent Application Publication No. U.S. Pat. No. 20160309692 A1, published on 2016 Oct. 27 to Opshaug; Kortney for Marine Life Trap. However, it differs from the present invention because Opshaug teaches apparatuses, methods, and systems are provided for making the harvesting of sea life efficient. For example, real-time or periodic information about the status of the many traps a fisherman may have set is communicated to the fisherman while the traps are still in the water. A fisherman can use this information to determine the best time and path for trap retrieval and reset operations to reduce fuel use and improve the catch efficiency per unit effort . . . "In the second embodiment, the entry and/or exit ports of the trap can be modified with gates that are instrumented with sensors to detect when an animal enters and/or exits the trap. Tracking the number of entrances and exits will result in a running count of the number of specimens contained in the trap."

Applicant believes that another reference corresponds to U.S. Patent Application Publication No. US20030056419 A1, published on 2003 Mar. 27 to Squires, Vance Randolph for System For Fishing. However, it differs from the present invention because Squires teaches a data acquisition and retrieval system (11) for fishing. Input means (37) are provided for inputting: (i) geographical positioning data indicating the geographical position of a point for fishing in substantially real-time relative to a region: (ii) weather data indicating the prevailing weather conditions applying to the geographical position of the point in the region; (iii) fish data characterising the fish located at or obtained at the point; (iv) time data specifying the date, time or season corresponding to the real-time at the point; and (v) water condition data of the prevailing environment at the point. A database (60) is provided for storing the data input by the input means (35) relative to the geographical position of the point and linking the data to any previous data stored for the particular geographical position of the point. A graphical user interface accesses the linked data of the database and outputs it in an appropriate medium, usually a display that presents an image pane (141), for interpreting by a user of the system. The system is particularly suited to lobster or prawn fishing in the ocean and can be used to predict where to fish. A method for fishing based on the system is also described . . . . The counter panel 21 is used to count the fish and enter data relating thereto. In the case of lobster, record is taken of whether lobster pulled in a pot shown at 105 and counted at 107 in FIG. 1, are male or female by pressing buttons 109 and 111 respectively, and buttons for other relevant data. The number panel is used for entering the number caught and the pot numbers, if necessary.

Applicant believes that another reference corresponds to U.S. Patent Application Publication No. US20130109259 A1, published on 2013 May 2 to ABULRASSOUL for Remotely actuated marker buoy. However, it differs from the present invention because ABULRASSOUL teaches that the remotely actuated marker buoy is releasably tethered to, or immediately adjacent to, a maritime animal trap (e.g., crab trap, lobster pot, etc.) or other submerged object requiring recovery. The operator (fisherman, etc.) uses a transmitter to send a signal to a receiver at the trap to release the buoy when trap recovery is desired. The buoy is tethered to the trap, enabling the fisherman to sight the buoy when it rises to the surface and thus recover the trap by drawing up the tether. The transmitter may include an authentication code requirement to prevent another party from recovering the trap if the transmitter is stolen. The system may include a reply transmitter at the trap to provide a signal if the trap is empty and cancel the release of the buoy. The operator may override this recovery cancellation, if desired . . . . A portion of the mesh or screen trap wall above the entryway 24 is shown broken away to show a catch entry counter device 26 disposed above the entryway 24. The catch entry counter 26 includes an elongate trigger or stick-like element 28 depending therefrom and extending through the center of the entryway 24. When an animal (lobster, crab, etc.) enters the trap 10, the trigger 28 is pushed back, thereby causing the counter 26 to register a count.

Applicant believes that another reference corresponds to U.S. Patent Application Publication No. US20160363476 A1, published on 2016 Dec. 15 to Van Komen; Chadd for Electronic Weight Measuring Fishing Net. However, it differs from the present invention because Van Komen teaches tools and techniques for implementing electronic weight measurement using a handheld apparatus (e.g., fishing net or other handheld apparatus, etc.). In some embodiments, the handheld apparatus might measure a raw signal weight of an item (e.g., fish or other suitable item), and might measure at least one of angle of tilt or angle of rotation of the item with respect to the handheld apparatus, and, in some cases, might also measure at least one of angle of tilt or angle of rotation of the item with reference to gravitational direction of the Earth. The handheld apparatus might calculate a processed signal weight of the item based at least in part on the measured angle of tilt and/or rotation of the item with respect to the at least one of the weight measurement sensor or the handle, and might display the processed signal weight of the item.

Applicant believes that another reference corresponds to U.S. Patent Application Publication No. US20240057575 A1, published on 2024 Feb. 22 to HONG; Ben for DEEP WATER CRUSTACEAN HOOP NET. However, it differs from the present invention because HONG teaches a hoop net for deep water crab and lobster fishing includes a smaller upper double ring coupled to a larger lower double ring via lateral support beams, and covered by a net with an opening defined by the upper double ring, and further including a smaller inner double ring affixed to the bottom of the net and located centrally relative to the upper and lower double rings.

Applicant believes that another reference corresponds to U.S. Patent Application Publication No. US20230165228 A1, published on 2023 Jun. 1 to Brighi; Jordan David for SYSTEM AND METHOD FOR A COLLAPSIBLE RECREATIONAL LOBSTER TRAP. However, it differs from the present invention because Brighi teaches the invention is a collapsible lobster trap configured to trap lobsters recreationally. The trap comprises a frame that may pull apart for transport and assemble for use, a netting that encloses the inside of the trap, an external entrance opening that allows lobsters to enter but not exit the trap, an inner funnel that allows a lobster to travel between two inner compartments of the trap, and an escape opening that enables users to remove lobsters from the trap.

Applicant believes that another reference corresponds to U.S. Patent Application Publication No. US20120144722 A1, published on 2012 Jun. 14 to Havens; Kirk J. for CRUSTACEAN TRAP WITH DEGRADABLE CULL RING PANEL. However, it differs from the present invention because Havens teaches a description of crustacean fishing traps having degradable cull panels, as well as methods for ensuring that such traps have reduced functionality after becoming derelict. Derelict crab and lobster traps have a negative economic and ecological impact, and thus it is advantageous to use crustacean fishing traps that will lose their ability to catch and retain fish over time. Incorporating degradable cull panels into such traps provides an effective, economical solution. Suitable degradable cull panels are described herein.

Applicant believes that another reference corresponds to U.S. Patent Application Publication No. US20070277427 A1, published on 2007 Dec. 6 to Goodwin; William Hooper for Lobster trap with ring guard assembly. However, it differs from the present invention because Goodwin teaches a lobster trap that promotes entry of lobsters into the trap while restricting lobsters from exiting the trap. Accordingly, a lobster trap comprises at least one head including an opening for entry into an interior of the trap, and a shield member mounted to the trap adjacent the opening. The shield member extends into the interior of the trap away from a plane of the opening and shields the opening from egress from the interior of the trap from at least one direction while not restricting entry to the interior of the trap. The lobster trap can further include a guard member extending from the shield so as to further restrict exit from the trap via the head.

Applicant believes that another reference corresponds to U.S. Patent Application Publication No. US20130091755 A1, published on 2013 Apr. 18 to Marks; James Dennis for Mark I Lobster Net. However, it differs from the present invention because Marks teaches Sport fishing for lobsters by divers is done with a hand held net. Lobsters in a net try to escape through the large net opening by flipping their tails. It is accordingly an object of the invention to trap a lobster and prevent it from escaping. The Mark I lobster net closes by flipping a lever with the thumb, preventing the lobster from escape. The overall density of the net is greater than that of sea water. If the net is dropped, it will fall to the bottom and not drift off. The handle is painted a florescent yellow so that it can be seen on the ocean floor.

Applicant believes that one of the closest references corresponds to U.S. Pat. No. 4,357,902 issued to Sheldon; William W. on 1982 Nov. 9 for A System for Holding and Transporting Lobsters. However, it differs from the present invention because Sheldon teaches a specially adapted container for transporting lobsters or other marine organisms in an aerated water environment is in the basic configuration of a drum housing with removeable cover and vent hole. A low pressure air diffuser is positioned in the drum housing at the base for releasing diffuse low pressure air into sea water contained in the drum. Air coupling for delivering low pressure air to the diffuser is provided along with inlet and outlet openings for circulating fresh sea water in lieu of diffuser aeration. Different covers for the container may be provided for loading by the fisherman and for subsequent transport. The invention further includes a complete system for containerized transport of lobsters by truck or other vehicle in the aerated water environment provided by the containers. The method of the invention provides for handling and transporting lobsters in aerated sea water from a boat at the dock to a lobster pound or similar destination. The method may be completely automated as disclosed. Injury to the lobsters and consequent shrinkage of pounded lobsters live stored for long periods of time is effectively eliminated.

Other patents describing the closest subject matter provide for a number of more or less complicated features that fail to solve the problem in an efficient and economical way. None of these patents suggest the novel features of the present invention.

SUMMARY OF THE INVENTION

The present invention is a handheld marine life holding apparatus with counter, comprising an apparatus assembly, a flap pulley system, and a net assembly. The apparatus assembly contains an apparatus body that defines a first apparatus opening and a second apparatus opening. The apparatus body comprises a handle. The apparatus body further comprises a belt attachment point with a carabiner hole. The belt attachment point is located opposite to the handle. The handle comprises at least two prongs. The at least two prongs are used to measure marine life. The apparatus assembly comprises a counter mounted onto the apparatus body. The flap pulley system is mounted onto the apparatus body and attached to the counter. The flap pulley system comprises a flap having a flap wire. The flap pulley system is incorporated within the apparatus body. The counter has reset knob. The net assembly is removably attached to the apparatus body. The net assembly comprises a net. The net comprises a zipper. The zipper is used to remove the marine life from the net. A securing tie secures the net to the apparatus body. The apparatus system is partially inserted into the net assembly. The net assembly extends under the counter.

It is therefore one of the main objects of the present invention to provide a net system where marine life and other objects are counted and stored while in a body of water such as when diving or snorkeling.

It is another object of this invention to provide a waterproof handheld marine life holding apparatus with a counter.

It is another object of this invention to provide a system for measuring the length of marine life to assure that they meet or surpass legal minimums for length.

It is another object of this invention to provide a way to safely transport marine life from a body of water to a receptacle.

It is another object of this invention to provide a handheld marine life holding apparatus with a counter that is volumetrically efficient for carrying, transporting, and storage.

It is another object of this invention to provide a handheld marine life holding apparatus with a counter that can be readily assembled and disassembled without the need of any special tools.

It is another object of this invention to provide a handheld marine life holding apparatus with a counter, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF DRAWINGS

With the above and other related objects in view, the invention consists in the details of construction and combination of parts as will be more fully understood from the following description, when read in conjunction with the accompanying drawings in which.

DETAILED DESCRIPTION OF THE INVENTION

Figure 1:
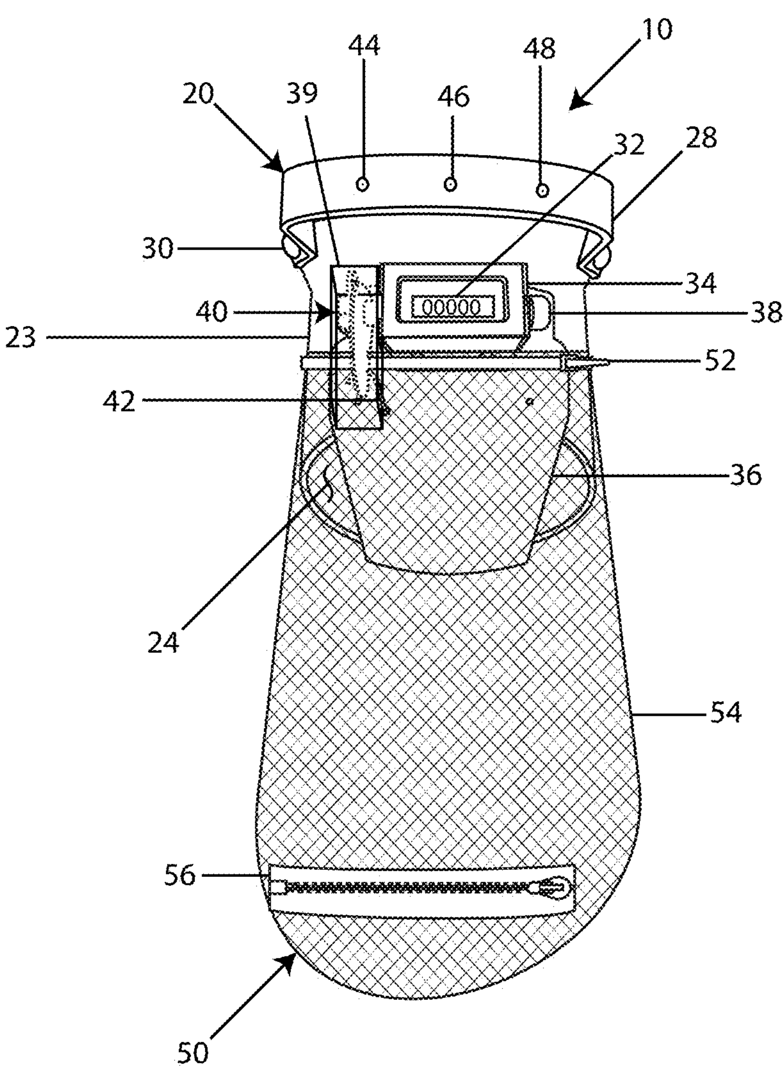
FIG. 1 represents a front view of the present invention.

Referring now to the drawings, the present invention is a handheld marine life holding apparatus with counter and is generally referred to with numeral 10. It can be observed that it basically includes apparatus assembly 20, flap pulley system 40, and net assembly 50.

Figure 2:
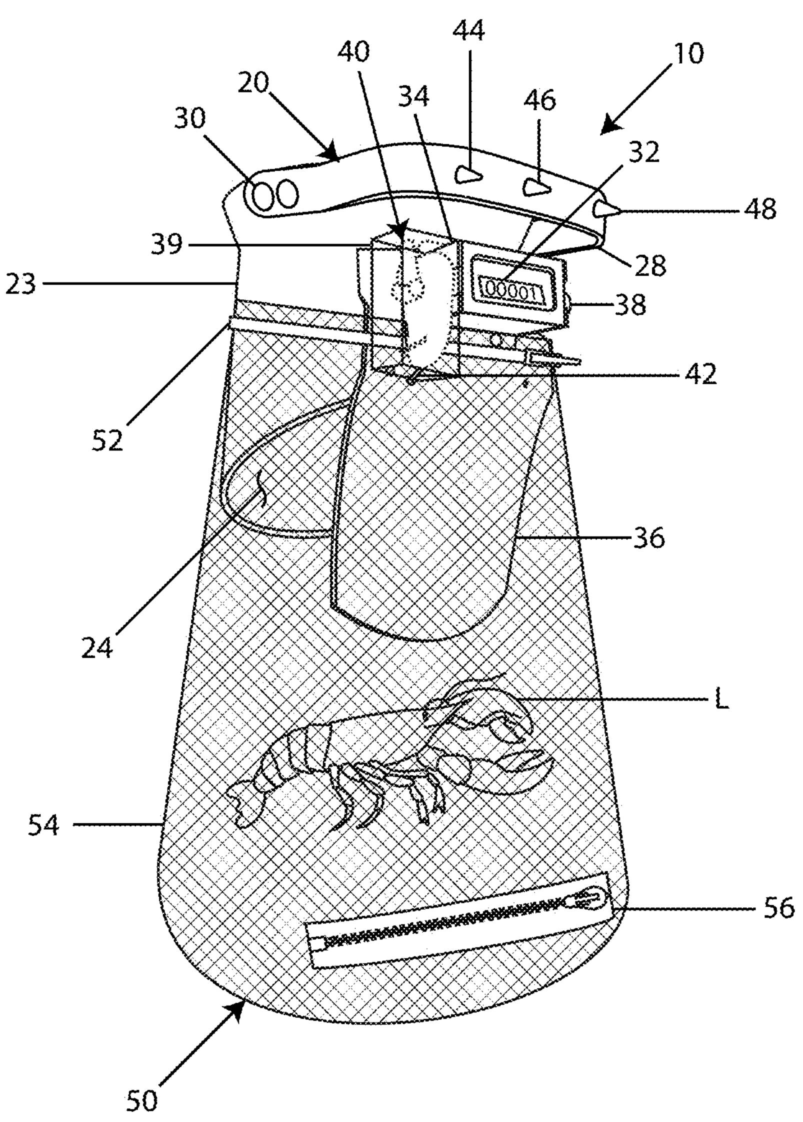
FIG. 2 is an isometric view of the present invention.

As seen in FIGS. 1 and 2, apparatus assembly 20 comprises apparatus body 23. Attached to a top of apparatus body 23 via rivets 30 is handle 28. In a preferred embodiment, handle 28 is held in place by at least two rivets 30.

Jutting out of handle 28 are prongs 44, 46, and 48 that are a system to measure marine life so that they are in accordance with legal sizes when catching. As an example, prongs 44, 46, and 48 can be a zero prong, a crab prong, and a lobster prong respectively. The zero prong is a zero point as a measurement. Prong 44 to prong 46 may define a first predetermined distance that can be a minimum carapace width for hard-shell blue crabs in the State of Florida as an example. Prong 44 to prong 48 may define a second predetermined distance that can be a minimum length of a fish or lobster in the State of Florida as another example. In a preferred embodiment, present invention 10 comprises at least two prongs such as prongs 44 and 46.

Apparatus assembly 20 further comprises counter 32 mounted onto apparatus body 23 within counter frame 34. Counter 32 allows to count a quantity of marine life placed into present invention 10. In a preferred embodiment counter 32 is located on a same side as handle 28. On a side of counter 32 is reset knob 38 to reset counter 32 to "00000". It is noted that counter 32 can obviously have fewer digits to read "0000", "000", "00" and even "0".

Apparatus system 20 is partially inserted into net assembly 50, whereby net assembly 50 is removably attached onto apparatus body 23, specifically below counter 32. Net assembly 50 comprises securing tie 52 and net 54. Net 54 has zipper 56. Net 54 is used to retain marine life. Marine life also referred to as sea life or ocean life and is the collective ecological communities that encompass all aquatic animals, plants, algae, fungi, protists, single-celled microorganisms and associated viruses living in the saline water of marine habitats, either the sea water of marginal seas and oceans, or the brackish water of coastal wetlands, lagoons, estuaries and inland seas. As an example, marine life includes lobsters L, fish, shrimp, crabs, etc. Zipper 56 is used to easily remove marine life from net 54. Securing tie 52 secures net 54 to apparatus body 23.

Flap pulley system 40 comprises flap 36 having flap wire 42 secured thereon. Flap wire 42 extends from flap 36 and mechanically connects a tab or link that connects to counter 32. In a resting state, flap 36 is in a closed position mostly blocking second apparatus opening 24 as seen in FIG. 1. Flap pulley system 40 is covered by pulley system cover 39.

In addition, flap pulley system 40 is incorporated within apparatus body 23, whereby counter 32 is mechanically attached to flap pulley system 40. As best seen in FIG. 2, counter 32 reads "00001", as one lobster L has been placed into present invention 10.

Figure 3:
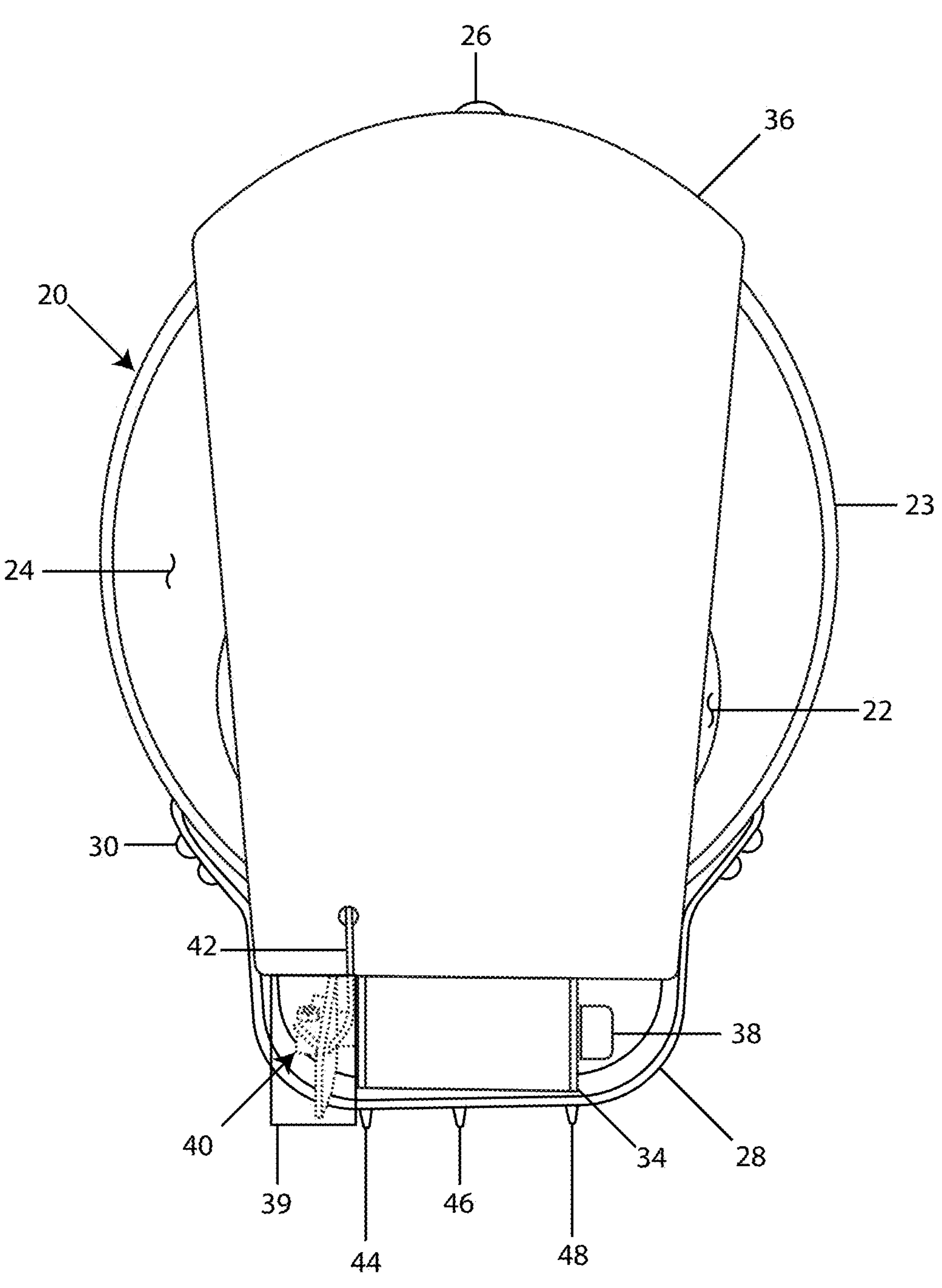
FIG. 3 is a bottom view of the present invention without a net assembly.
Figure 4:
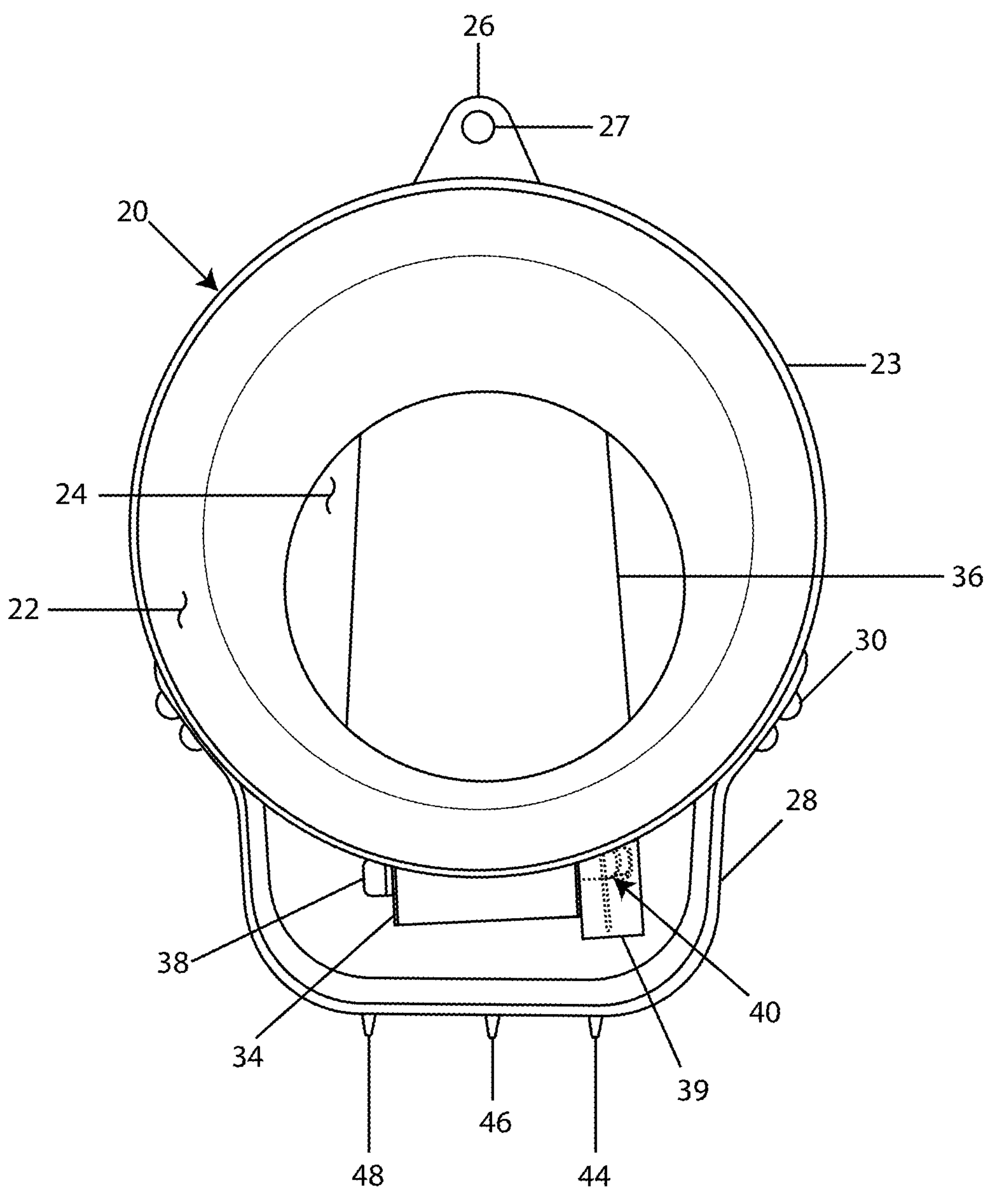
FIG. 4 is a top view of the present invention without the net assembly.

As best seen in FIGS. 3 and 4, apparatus assembly 20 comprises first and second apparatus openings 22 and 24 respectively. Apparatus body 23 comprises belt attachment point 26 having carabiner hole 27. In a preferred embodiment, belt attachment point 26 is positioned opposite to handle 28 on apparatus body 23.

Flap pulley system 40 comprises flap 36 having flap wire 42 secured thereon. Flap wire 42 extends from flap 36 and mechanically connects a tab or link that connects to counter 32 seen in FIGS. 1 and 2. In a resting state, flap 36 is in a closed position mostly blocking second apparatus opening 24 as seen in FIG. 1. Flap pulley system 40 is covered by pulley system cover 39.

When a marine life is caught, a user will use a force to overcome flap 36 causing it to move to an open position, mostly unblocking second apparatus opening 24 as seen in FIG. 2, actuating flap wire 42 extending therefrom and the tab or link that connects to counter 32 and causing it to count once. Each time a force overcomes flap 36 causing it to move to an open position, counter 32 counts. Therefore, assuming a user places four marine life into present invention 10, by using a force four times to overcome flap 36, will register a count of "00004" on counter 32. Reset knob 38 is used to reset counter 32 to "00000".

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A handheld marine life holding apparatus with counter, comprising:

A) an apparatus assembly comprising an apparatus body that defines a first apparatus opening and a second apparatus opening, said apparatus body comprises a handle, said handle comprises a first, a second, and a third prong used to measure marine life, a counter is mounted onto said apparatus body, whereby the first, the second, and the third prongs are positioned at a top of said apparatus body above said counter, wherein the first, the second, and the third prongs protrude from said handle, at its central section, defining a predetermined distance between them, whereby the first prong is a zero point as a measurement, from the first prong to the second prong is defined a first predetermined distance that is a minimum carapace width for hard-shell blue crabs, and from the first prong to the third prong is defined a second predetermined distance that is a minimum length of a fish or lobster;

B) a flap pulley system mounted onto said apparatus body and attached to said counter, said flap pulley system comprises a flap having a flap wire; and C) a net assembly extending under said counter, wherein said apparatus system is partially inserted into said net assembly, said net assembly comprises a net comprising a zipper horizontally positioned close to a bottom of said net.

2. The handheld marine life holding apparatus with counter set forth in claim 1, wherein said apparatus body further comprises a belt attachment point with a carabiner hole.

3. The handheld marine life holding apparatus with counter set forth in claim 2, wherein said belt attachment point is located opposite to said handle.

4. The handheld marine life holding apparatus with counter set forth in claim 1, wherein said flap pulley system is incorporated within said apparatus body.

5. The handheld marine life holding apparatus with counter set forth in claim 1, wherein said counter has reset knob.

6. The handheld marine life holding apparatus with counter set forth in claim 1, wherein said net assembly is removably attached to said apparatus body.

7. The handheld marine life holding apparatus with counter set forth in claim 1, wherein said zipper is used to remove said marine life from said net.

8. The handheld marine life holding apparatus with counter set forth in claim 1, wherein a securing tie secures said net to said apparatus body.

* * * * *